(12) United States Patent
Morse

(10) Patent No.: US 6,290,623 B1
(45) Date of Patent: Sep. 18, 2001

(54) REMOVABLE SUPPORT OF MOTOR VEHICLE DIFFERENTIAL SIDE GEAR THAT FACILITATES MACHINING

(75) Inventor: David M. Morse, Waterford, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/340,525

(22) Filed: Jun. 28, 1999

(51) Int. Cl.[7] .............................. F16H 48/06; F16H 48/20
(52) U.S. Cl. ........................... 475/231; 475/238; 74/640
(58) Field of Search ............................ 475/86, 231, 88, 475/230, 248; 74/650

(56) References Cited

U.S. PATENT DOCUMENTS

| | | |
|---|---|---|
| 4,811,628 | 3/1989 | Winkam et al. . |
| 5,007,886 * | 4/1991 | Holmquist et al. ................. 457/231 |
| 5,041,065 | 8/1991 | Kwoka . |
| 5,133,696 | 7/1992 | Kobayashi . |
| 5,520,589 * | 5/1996 | Dewald et al. ...................... 475/231 |
| 5,556,343 | 9/1996 | Gassmann et al. . |

* cited by examiner

Primary Examiner—Sherry Estremsky
Assistant Examiner—Tisha D. Lewis
(74) Attorney, Agent, or Firm—Oldham & Oldham Co., L.P.A.

(57) ABSTRACT

A removable support of motor vehicle differential side gear that facilitates machining which is added after the internal features of a two-piece motor vehicle differential case have been machined to position and support a motor vehicle differential side gear in the two-piece motor vehicle differential case and preclude gear movement therein. The removable motor vehicle differential side gear support is preferably fabricated from a structurally sound material, such as steel, and has a configuration similar to a washer. The removable motor vehicle side gear support is preferably removably secured to the two-piece motor vehicle differential case by, for example, mechanical fasteners, such a plurality of threaded bolts which pass through a corresponding plurality of clearance openings in the removable motor vehicle side gear support and are received in and secured in a corresponding plurality of internally threaded openings in the two-piece motor vehicle differential case.

17 Claims, 1 Drawing Sheet

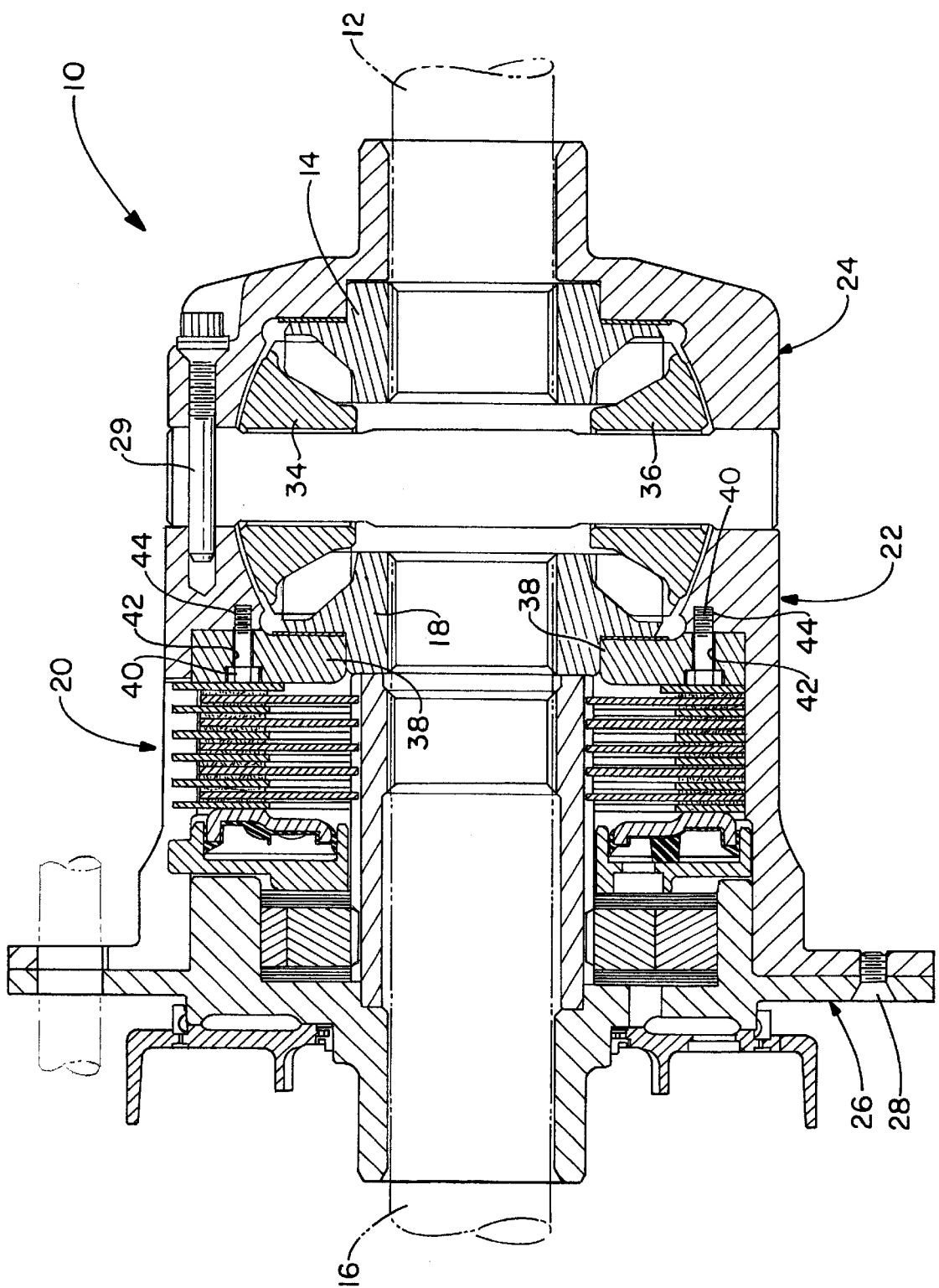

REMOVABLE SUPPORT OF MOTOR VEHICLE DIFFERENTIAL SIDE GEAR THAT FACILITATES MACHINING

BACKGROUND AND SUMMARY OF THE INVENTION

The present invention relates generally to new and novel improvements in a removable support of motor vehicle differential side gear that facilitate machining. More particularly, the present invention relates to new and novel improvements in a removable support of motor vehicle differential side gear that facilitate machining which is preferably added after the internal features of a two-piece motor vehicle differential case have been machined to position and support a motor vehicle differential side gear in the two-piece motor vehicle differential case and preclude gear movement therein.

In known prior art motor vehicle differential assemblies having a two-piece motor vehicle differential case, motor vehicle differential side gear supports are typically cast into the two-piece motor vehicle differential case. It is customary to then machine the internal features of the two-piece motor vehicle differential case through "windows" in the two-piece motor vehicle differential case. While machining the internal features of a two-piece motor vehicle differential case through "windows" in the two-piece motor vehicle differential case may have worked well in the past, such a process may take more time, and thus be more expensive to produce, than would be desirable.

Accordingly, it would be desirable to provide a removable support of motor vehicle differential side gear that facilitates machining which is added after the internal features of a two-piece motor vehicle differential case have been machined to position and support a motor vehicle differential side gear in the two-piece motor vehicle differential case and preclude gear movement therein. The removable motor vehicle differential side gear support is preferably fabricated from a structurally sound material, such as steel, and has a configuration similar to a washer. The removable motor vehicle side gear support is preferably removably secured to the two-piece motor vehicle differential case by, for example, mechanical fasteners, such a plurality of threaded bolts which pass through a corresponding plurality of clearance openings in the removable motor vehicle side gear support and are received in and secured in a corresponding plurality of internally threaded openings in the two-piece motor vehicle differential case.

Other advantages and novel features of the present invention will become apparent in the following detailed description of the invention when considered in conjunction with the accompanying drawing.

BRIEF DESCRIPTION OF THE DRAWING

The sole FIGURE is a cross-sectional view of a motor vehicle differential assembly including a removable motor vehicle differential side gear support that facilitates the machining of the internal features in a motor vehicle differential case in accordance with a preferred embodiment of the present invention.

DETAILED DESCRIPTION OF THE DRAWING

In the following detailed description of a preferred embodiment of the present invention, reference is made to the accompanying drawing which, in conjunction with this detailed description, illustrates and describes a preferred embodiment of a motor vehicle differential assembly including a removable motor vehicle differential side gear support that facilitates the machining of the internal features in a motor vehicle differential case in accordance with the present invention. Referring now to the drawing, the single FIGURE illustrates a cross-sectional view of a motor vehicle differential assembly including a removable motor vehicle differential side gear support that facilitates the machining of the internal features in a motor vehicle differential case in accordance with a preferred embodiment of the present invention.

Motor vehicle differential assembly 10 is generally of conventional design and includes first output shaft 12 having first motor vehicle differential side gear 14 and second output shaft 16 having second motor vehicle differential side gear 18. Motor vehicle differential assembly 10 is, most preferably, a lockable motor vehicle differential assembly 10 and includes clutch assembly 20. Motor vehicle differential case 22 is, most preferably, a two-piece motor vehicle differential case and includes first motor vehicle differential case member 24 and second motor vehicle differential case member 26. First motor vehicle differential case member 24 and second motor vehicle differential case member 26 are preferably removably held together by a plurality of fasteners 28, most preferably a plurality of threaded bolts. Motor vehicle differential case 22 houses first motor vehicle differential side gear 14 on first output shaft 12 and second motor vehicle differential side gear 18 on second output shaft 16, as well as first pinion mate gear 34 and second pinion mate gear 36. Motor vehicle differential case 22 also houses bearings, spacers, seals and fasteners, which are preferably of conventional design, for motor vehicle differential assembly 10.

Removable motor vehicle differential side gear support 38 is preferably added after the internal features of motor vehicle differential case 22 have been machined to position and support second motor vehicle differential side gear 18 in motor vehicle differential case 22 and preclude gear movement therein. Removable motor vehicle differential side gear support 38 is preferably fabricated from a structurally sound metallic material, such as steel, and has a configuration similar to a washer. Removable motor vehicle differential side gear support 38 is secured to second motor vehicle differential case member 26 by a plurality of removable mechanical fasteners 40, most preferably a plurality of threaded bolts, which pass through a corresponding plurality of clearance openings 42 in removable motor vehicle differential side gear support 38 and are received in and secured in a corresponding plurality of internally threaded openings 44 in second motor vehicle differential case member 26.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A motor vehicle differential assembly including a motor vehicle differential case which encloses a first motor vehicle differential side gear attached to a first output shaft, a second motor vehicle differential side gear attached to a second output shaft, a first pinion mate gear and a second pinion mate gear, said motor vehicle differential assembly comprising a removable motor vehicle differential side gear support removably attached to said motor vehicle differential case by a plurality of threaded fasteners to facilitate the machining of the internal features in the motor vehicle differential case and to support one of the first motor vehicle differential side gear and the second motor vehicle differential side gear in the motor vehicle differential case and preclude gear movement therein.

2. The motor vehicle differential assembly in accordance with claim 1, wherein the motor vehicle differential case is a two-piece motor vehicle differential case and includes a first motor vehicle differential case member and a second motor vehicle differential case member which are secured together to form the motor vehicle differential case by a plurality of mechanical fasteners.

3. The motor vehicle differential assembly in accordance with claim 2, wherein said removable motor vehicle differential side gear support is fabricated from a metallic material.

4. The motor vehicle differential assembly in accordance with claim 3, wherein said removable motor vehicle differential side gear support has a configuration similar to a washer.

5. The motor vehicle differential assembly in accordance with claim 1, wherein said removable motor vehicle differential side gear support is secured to one of the first motor vehicle differential case member and the second motor vehicle differential case member by a plurality of threaded bolts which pass through a corresponding plurality of clearance openings in said removable motor vehicle differential side gear support and are received in and secured in a corresponding plurality of internally threaded openings in one of the first motor vehicle differential case member and the second motor vehicle differential case member.

6. The motor vehicle differential assembly in accordance with claim 1, wherein said motor vehicle differential case is a two-piece motor vehicle differential case.

7. The motor vehicle differential assembly in accordance with claim 1, wherein said removable motor vehicle differential side gear support is fabricated from steel.

8. The motor vehicle differential assembly in accordance with claim 1, wherein said removable motor vehicle differential side gear support has a configuration similar to a washer.

9. A lockable motor vehicle differential assembly including a motor vehicle differential case which encloses a first motor vehicle differential side gear attached to a first output shaft, a second motor vehicle differential side gear attached to a second output shaft, a first pinion mate gear, a second pinion mate gear and a clutch assembly, said motor vehicle differential assembly comprising a removable motor vehicle differential side gear support removably attached to said motor vehicle differential case by a plurality of threaded fasteners to facilitate the machining of the internal features in the motor vehicle differential case and to support one of the first motor vehicle differential side gear and the second motor vehicle differential side gear in the motor vehicle differential case and preclude gear movement therein.

10. The lockable motor vehicle differential assembly in accordance with claim 9, wherein the motor vehicle differential case is a two-piece motor vehicle differential case and includes a first motor vehicle differential case member and a second motor vehicle differential case member which are secured together to form the motor vehicle differential case by a plurality of mechanical fasteners.

11. The lockable motor vehicle differential assembly in accordance with claim 9, wherein said removable motor vehicle differential side gear support is secured to one of the first motor vehicle differential case member and the second motor vehicle differential case member by a plurality of threaded bolts which pass through a corresponding plurality of clearance openings in said removable motor vehicle differential side gear support and are received in and secured in a corresponding plurality of internally threaded openings in one of the first motor vehicle differential case member and the second motor vehicle differential case member.

12. The lockable motor vehicle differential assembly in accordance with claim 9, wherein said motor vehicle differential case is a two-piece motor vehicle differential case.

13. The lockable motor vehicle differential assembly in accordance with claim 9, wherein said removable motor vehicle differential side gear support has a configuration similar to a washer.

14. The lockable motor vehicle differential assembly in accordance with claim 10, wherein said removable motor vehicle differential side gear support is fabricated from a metallic material.

15. The lockable motor vehicle differential assembly in accordance with claim 14, wherein said removable motor vehicle differential side gear support has a configuration similar to a washer.

16. The lockable motor vehicle differential assembly in accordance with claim 11, wherein when said removable motor vehicle differential side gear support is secured to one of the first motor vehicle differential case member and the second motor vehicle differential case member by a plurality of threaded bolts which pass through a corresponding plurality of clearance openings in said removable motor vehicle differential side gear support and are received in and secured in a corresponding plurality of internally threaded openings in one of the first motor vehicle differential case member and the second motor vehicle differential case member, said plurality of threaded bolts are below a top surface of said removable motor vehicle differential side gear support so said plurality of threaded bolts do not interfere with the operation of the clutch assembly.

17. A motor vehicle differential assembly including a differential case which encloses a first differential side gear attached to a first output shaft, a differential side gear attached to a second output shaft, a first pinion mate gear and a second pinion mate gear, said motor vehicle differential assembly comprising a differential side gear support removably secured to said differential case in a predetermined position preventing axial movement of one of the first differential side gear and the second differential side gear away from the first pinion mate gear and the second pinion mate gear.

* * * * *